US010737215B2

(12) United States Patent
Oishi et al.

(10) Patent No.: US 10,737,215 B2
(45) Date of Patent: Aug. 11, 2020

(54) DRYER FOR AIR SUSPENSION

(71) Applicant: AISIN SEIKI KABUSHIKI KAISHA, Kariya-shi, Aichi-ken (JP)

(72) Inventors: Masaaki Oishi, Takahama (JP); Satoshi Kimura, Anjo (JP); Taichi Mizuno, Anjo (JP); Masakazu Ohashi, Toyota (JP); Hiroyuki Uehara, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 21 days.

(21) Appl. No.: 16/084,784

(22) PCT Filed: Mar. 16, 2017

(86) PCT No.: PCT/JP2017/010591
§ 371 (c)(1),
(2) Date: Sep. 13, 2018

(87) PCT Pub. No.: WO2017/199567
PCT Pub. Date: Nov. 23, 2017

(65) Prior Publication Data
US 2019/0070553 A1    Mar. 7, 2019

(30) Foreign Application Priority Data

May 19, 2016 (JP) .................................. 2016-100077

(51) Int. Cl.
*B01D 53/26* (2006.01)
*B60G 17/052* (2006.01)
(Continued)

(52) U.S. Cl.
CPC ....... *B01D 53/261* (2013.01); *B01D 53/0407* (2013.01); *B60G 17/052* (2013.01);
(Continued)

(58) Field of Classification Search
None
See application file for complete search history.

(56) References Cited

U.S. PATENT DOCUMENTS

| 4,673,419 A | * | 6/1987 | Kojima | ................ | B01D 53/261 |
| | | | | | 55/DIG. 17 |
| 4,713,094 A | * | 12/1987 | Yanagawa | ............ | B01D 53/261 |
| | | | | | 55/DIG. 17 |

(Continued)

FOREIGN PATENT DOCUMENTS

| JP | 2007525324 A | 9/2007 |
| JP | 201216669 A | 1/2012 |
| JP | 2015098792 A | 5/2015 |

OTHER PUBLICATIONS

International Search Report (PCT/ISA210) dated Jun. 20, 2017, by the Japanese Patent Office as the International Searching Authority for International Application No. PCT/JP2017/010591.

*Primary Examiner* — John Fox
(74) *Attorney, Agent, or Firm* — Buchanan Ingersoll & Rooney PC

(57) ABSTRACT

A housing includes an air introduction flow passage, an air discharge flow passage, and a desiccant agent accommodated in the housing. One end portion of the housing is at a lower side of the housing in a vertical direction aligned with the axial direction. An air-liquid separation chamber is formed at a bottom portion of the housing, and includes an air supply passage supplying air to the desiccant agent at an upper housing surface, and is communicated with the air introduction flow passage and the air discharge flow passage to separate moisture in the air introduced from the air introduction flow passage. An adsorption member is accommodated in the air-liquid separation chamber to adsorb moisture separated in the air-liquid separation chamber. Air introduced from the air introduction flow passage is supplied (Continued)

to an air suspension device through the adsorption member and the desiccant agent.

9 Claims, 5 Drawing Sheets

(51) Int. Cl.
  *B01D 53/04* (2006.01)
  *B60T 17/00* (2006.01)
(52) U.S. Cl.
  CPC ........ *B60G 17/0523* (2013.01); *B60T 17/004* (2013.01); *B01D 2253/106* (2013.01); *B01D 2259/124* (2013.01); *B01D 2259/40* (2013.01); *B01D 2259/4566* (2013.01); *B60G 2600/66* (2013.01)

(56) References Cited

U.S. PATENT DOCUMENTS

| | | | |
|---|---|---|---|
| 5,002,593 A * | 3/1991 | Ichishita | ............... B60T 17/004 96/137 |
| 5,385,592 A * | 1/1995 | Maeda | ............... B01D 46/0023 55/323 |
| 5,427,609 A | 6/1995 | Zoglman et al. | |
| 8,500,885 B2 | 8/2013 | Honjo | |
| 2003/0177743 A1 | 9/2003 | Witengier | |
| 2005/0188848 A1 | 9/2005 | Salzman et al. | |
| 2012/0006198 A1 | 1/2012 | Honjo | |

\* cited by examiner

DRYER FOR AIR SUSPENSION

TECHNICAL FIELD

The present invention relates to a dryer for an air suspension, particularly to a dryer suitable for an air suspension device of a vehicle.

BACKGROUND ART

With respect to a dryer for an air suspension installed in a vehicle, in Patent document 1 as listed below, for example, proposed is "a dryer for an air suspension, which includes inflow and outflow ports formed at axial opposite ends of a housing formed in a tubular shape, with a desiccant agent being supported between a pair of filters accommodated in the housing, and which dries fluid introduced from the inflow port through the desiccant agent, and discharges dried air from the outflow port to be supplied to the air suspension of the vehicle, the dryer comprising a guide member, which is disposed between the filter of the inflow port side and the inflow port, to support the filter of the inflow port side and guide the fluid into the desiccant agent through the filter of the inflow port side, and which is formed with a shielding tubular portion having an opening with an opening area thereof being larger than an opening area of the inflow port, including the inflow port to form a flow passage from the inflow port to the filter of the inflow port side, and forming an inner surface as a shielding surface, and an annular plate extending radially outward from the opening of the shielding tubular portion and being formed with a plurality of communication holes, the guide member being formed in a hat-shaped cross section, wherein the fluid is introduced from the inflow port into the shielding tubular portion, and guided to the communication holes of the annular plate through the flow passage, and wherein the housing includes an orifice for increasing a flow rate of the fluid introduced from the inflow port to the shielding tubular portion of the guide member" (described in Paragraph 0008 of Patent document 1). The air suspension with this dryer being installed therein configures an air suspension system of a so-called open type, which is compared with an air suspension system of a so-called closed type.

As for the air suspension system of the closed type, for example, Patent document 2 discloses an air suspension system equipped with an air compressor device, which is disclosed in FIG. 9 of the document, and as a component of which a dryer is disclosed.

PRIOR ART DOCUMENT

Patent Document

[Patent document 1] Japanese Patent No. 5732756
[Patent document 2] Japanese Patent Laid-open Publication No. 2015-98792

SUMMARY OF THE INVENTION

Problems to be Solved by the Invention

According to the dryer for the air suspension as described in the Patent document 1, described in its Paragraph 0011 is "The fluid is guided from the inflow port to the shielding tubular portion of the air guide member, then, the fluid makes contact with its shielding surface due to inertia, thereafter, moisture included in the fluid disperses, and properly guided to the holes of the annular plate, so that the fluid is efficiently dried by the desiccant agent, to discharge the dry air from the outflow port", and described is "The fluid is increased in flow rate by the orifice and guided into the shielding tubular portion, so that the moisture in the fluid is dispersed more efficiently, whereby drying efficiency is more improved. As a result, the axial length of the desiccant accommodating portion of the housing may be made much shorter, thereby further increasing its installability relative to the vehicle". Thus, it is so constituted that the fluid (compressed air containing moisture sucked from the outside air) collides with the shielding surface to disperse the moisture, so that the regeneration efficiency of the desiccant agent is improved, and the dryer as disclosed in Patent document 2 is configured likewise.

For example, if the moisture dispersed by the dryer remains within the dryer, and if the moisture moves toward the desiccant agent to be adsorbed therein, it will be difficult to maintain a desired drying efficiency. In the case where it is served for the air suspension system of the open type as disclosed in Patent document 1, the above-described possibility is low. However, in the case where it is served for the air suspension system of the closed type as disclosed in Patent document 2, the air within the system is normally circulated to be used, and the outside air is sucked only in case of insufficient amount of the air, so that a part of sucked amount of the air is used for the regeneration of the dryer immediately after suction of the air. Therefore, if there exists the remained moisture, every time when the air is circulated in the dryer, the remained moisture is likely to move toward the desiccant agent to be adsorbed therein. Consequently, especially in case of the dryer served for the air suspension system of the closed type, it is important to reduce a possibility of the moisture being remained in the dryer as low as possible, and prevent the remained moisture from moving toward the desiccant agent.

Accordingly, it is an object of the present invention to provide a dryer for an air suspension, which is able to prevent the moisture being remained, and properly prevent the remained moisture from moving toward the desiccant agent.

Means for Solving the Problems

In order to solve the above-described problem, the present invention relates to a dryer for an air suspension installed in an air suspension device of a vehicle, which comprises a housing having an air introduction flow passage and an air discharge flow passage located on one end potion in an axial direction of the housing, the one end potion being placed at a lower side of the housing in a vertical direction aligned with the axial direction, a desiccant agent accommodated in the housing, an air-liquid separation chamber that is formed at a bottom portion of the housing, and that includes an air supply passage for supplying the air to the desiccant agent at an upper surface of the housing, the air-liquid separation chamber being communicated with the air introduction flow passage and the air discharge flow passage to separate moisture contained in the air introduced from the air introduction flow passage, and an adsorption member accommodated in the air-liquid separation chamber, to adsorb the moisture separated in the air-liquid separation chamber, and which is so constituted that the air introduced from the air introduction flow passage is supplied to the air suspension device through the adsorption member and the desiccant agent.

In the above-described dryer for the air suspension, the air-liquid separation chamber may include an expansion portion, a flow area of which is increased from the air introduction flow passage toward the air supply passage.

Also, it may be so configured that a flow direction of the air introduced from the air introduction flow passage to the air-liquid separation chamber is perpendicular to a flow direction of the air supplied to the air supply passage after introduction of the air. Furthermore, it may be so configured that the air discharge flow passage is communicated with the air-liquid separation chamber at a lower side of the adsorption member.

In the above-described dryer for the air suspension, it may be so configured that the dryer comprises a separation wall portion integrally erected from the bottom portion of the housing, and a lid member having the air supply passage, the lid member being abutted on the separation wall portion and supported by the housing, to define the air-liquid separation chamber. Particularly, it may be so configured that the adsorption member is closely adhered to the lid member, and held within the air-liquid separation chamber.

Effects of the Invention

As the present invention is configured as described above, the following effects are achieved. That is, according to the dryer for the air suspension of the present invention, provided are the air-liquid separation chamber that is formed at the bottom portion of the housing, and that includes an air supply passage for supplying the air to the desiccant agent at an upper surface of the housing, the air-liquid separation chamber being communicated with the air introduction flow passage and the air discharge flow passage to separate moisture contained in the air introduced from the air introduction flow passage, and the adsorption member accommodated in the air-liquid separation chamber, to adsorb the moisture separated in the air-liquid separation chamber, and it is so constituted that the air introduced from the air introduction flow passage is supplied to the air suspension device through the adsorption member and the desiccant agent. When the air containing the moisture is supplied from the outside air to the dryer, the air is introduced into the air-liquid separation chamber through the air introduction flow passage, so that a moisture precipitation is achieved positively, and the precipitated moisture is adsorbed by the adsorption member. Therefore, the moisture is properly prevented from being remained. And, when the air supplied to the desiccant agent through the air supply passage passes the air-liquid separation chamber, the contained moisture is removed to reduce the amount of moisture. Even if so-called purge air quantity is small, therefore, the regeneration can be easily achieved.

In the above-described dryer for the air suspension, if it is so constituted that the air-liquid separation chamber includes the expansion portion, a flow area of which is increased from the air introduction flow passage toward the air supply passage, the air is supplied from the air introduction flow passage of a relatively small flow area into the expansion portion, so that the moisture in the introduced air can be certainly separated and precipitated.

Also, if it is so configured that the air flow direction of the air introduced from the air introduction flow passage to the air-liquid separation chamber is perpendicular to the air flow direction of the air supplied to the air supply passage after introduction of the air, the moisture can be separated and precipitated more certainly. Furthermore, if it is so configured that the air discharge flow passage is communicated with the air-liquid separation chamber at the lower side of the adsorption member, when the air is discharged, the moisture adsorbed by the adsorption member can be certainly discharged outside.

In the above-described dryer for the air suspension, if it is so configured that the dryer comprises the separation wall portion integrally erected from the bottom portion of the housing, and the lid member having the air supply passage, and that the lid member is abutted on the separation wall portion and supported by the housing, to define the air-liquid separation chamber, the air-liquid separation chamber can be easily configured by a small number of parts. Particularly, if it is so configured that the adsorption member is closely adhered to the lid member, and held within the air-liquid separation chamber, the adsorption member can be held easily and certainly. For example, if the metallic lid member is used, heat is appropriately radiated through the lid member, so that the moisture precipitation is further accelerated.

EMBODIMENTS FOR CARRYING OUT THE INVENTION

Figure 5:
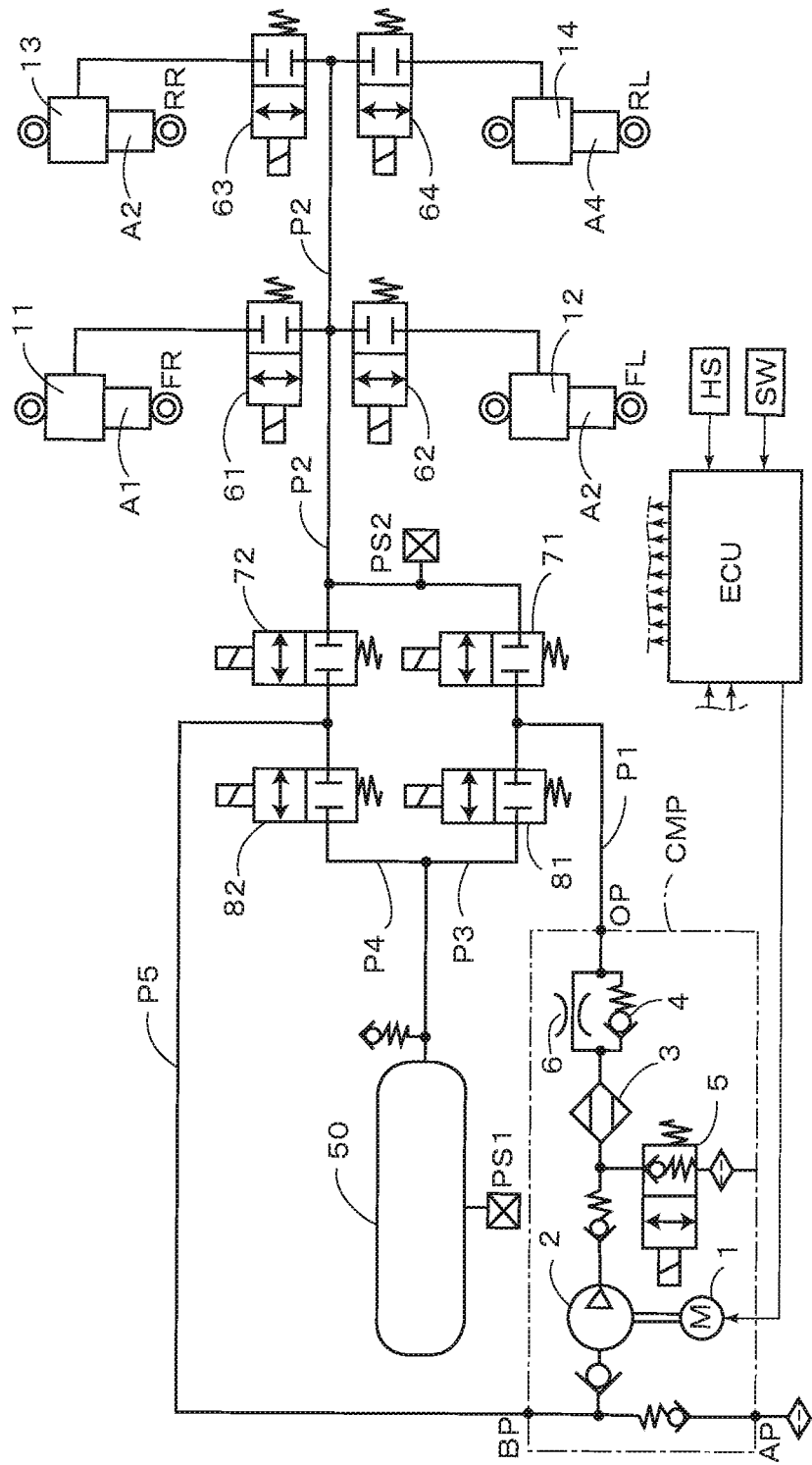
FIG. 5 is a block diagram showing an overall configuration of an air suspension device equipped with a dryer according to an embodiment of the present invention.

Hereinafter, will be explained a desirable embodiment of the present invention referring to drawings. FIGS. 1-4 show an air compressor device CMP which includes a dryer for an air suspension according to an embodiment of the present invention, and which is served as an air pressure supply source for use in an air suspension device of a vehicle as shown in FIG. 5, for example. A fundamental configuration of the air compressor device CMP includes an electric motor 1 served as a power source, a pump device 2 that produces a compressed air with the electric motor 1 being driven to rotate, and a dryer 3 that dries the compressed air produced by the pump device 2 and discharges it, and the device CMP is supported on a vehicle body (not shown) through an anti-vibration member (not shown). In FIG. 5, OP indicates a discharge port, BP indicates a back pressure introduction port, and AP indicates an atmosphere suction port.

The pump device 2 of the present embodiment includes a cylinder (not shown), and a piston (not shown) which is slidably supported within the cylinder, and which is connected to a crank a mechanism (not shown), by which a rotating motion of the electric motor 1 is converted into a reciprocating motion of the piston. In accordance with the reciprocating motion of the piston (not shown), therefore, the air introduced from the atmosphere suction port AP or the back pressure introduction port BP is compressed in a compression chamber (not shown), so that the compressed air is supplied to the dryer 3 through a discharge flow passage 2a.

Figure 1:
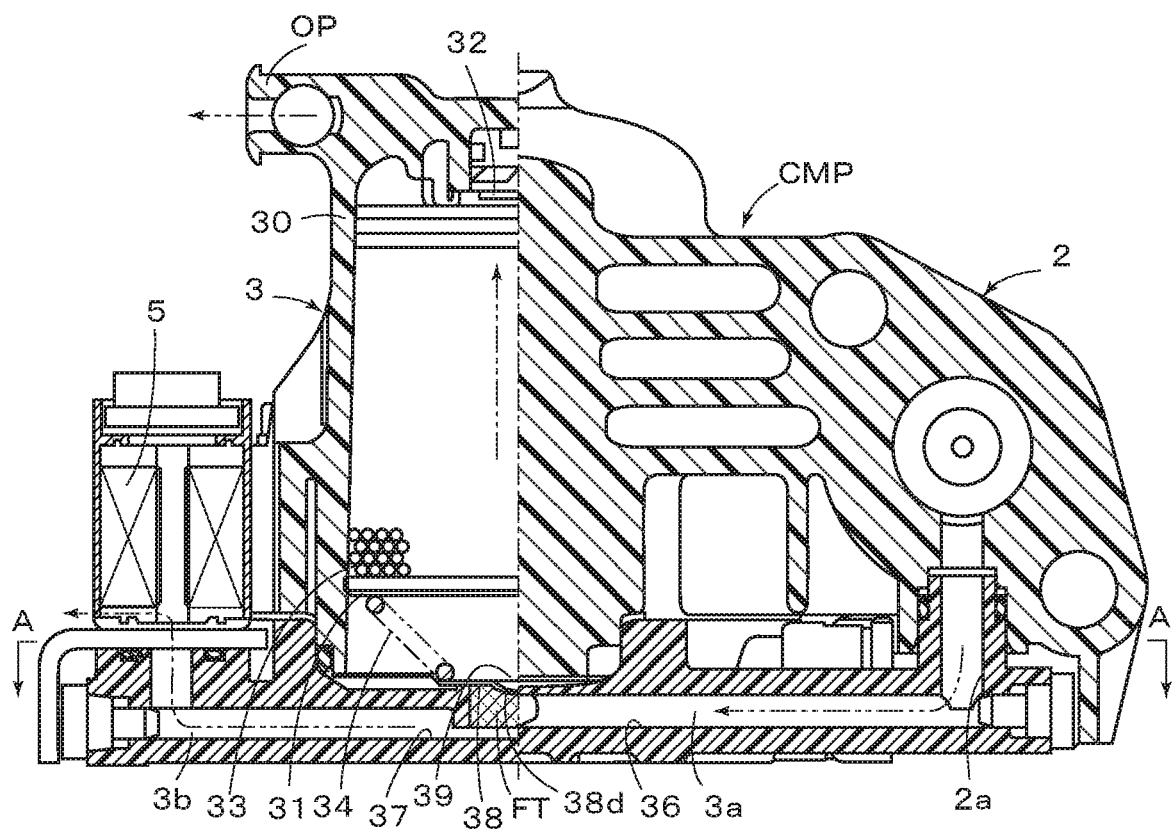
FIG. 1 is a front view of an air compressor device including a dryer for an air suspension according to an embodiment of the present invention.

Next, according to the dryer 3, with its sectional view (sectioned along B-B line in FIG. 4) being shown in FIG. 1, in a housing 30 having an introduction port 31 and discharge port 32 at opposite ends in its axial direction, a desiccant agent 33 (granular silica gel) is accommodated between a pair of filters (reference numerals omitted herein), and held by a coil spring 34 between the filters. The above-described introduction port 31 is connected to an air introduction flow passage 3a through an air-liquid separation chamber SC as described later, and the air introduction flow passage 3a is connected to an opening portion of the discharge flow passage 2a of the pump device 2. Also, the introduction port 31 is connected to an air discharge flow passage 3b through the air-liquid separation chamber SC, and in the air discharge flow passage 3b disposed is an air discharge valve 5, which is configured by a normally-closed electromagnetic switching valve. The housing 30 is configured by a cylindrical portion made of resin for accommodating therein the desiccant agent 33 and a bottom portion made of resin for supporting the cylindrical portion, as shown in FIG. 1, which are indicated together as the housing 30.

Accordingly, the compressed air introduced from the introduction port 31 into the housing 30, i.e., the air containing moisture to be discharged from the pump device 2 thorough the discharge flow passage 2a, is introduced from the air introduction flow passage 3a into the dryer 3 thorough the air-liquid separation chamber SC, and dried by the desiccant agent 33, then the dried air is discharged from the discharge port OP through the discharge port 32, to be supplied to a pressure accumulation tank (indicated by 50 in FIG. 5). Furthermore, at the discharge port 32, provided is a check valve 4 that allows an air flow in the discharging direction, and blocks its reverse flow, and in parallel with it, disposed is an orifice 6 that is always communicated via a throttle, as described later with reference to FIG. 5.

Figure 2:
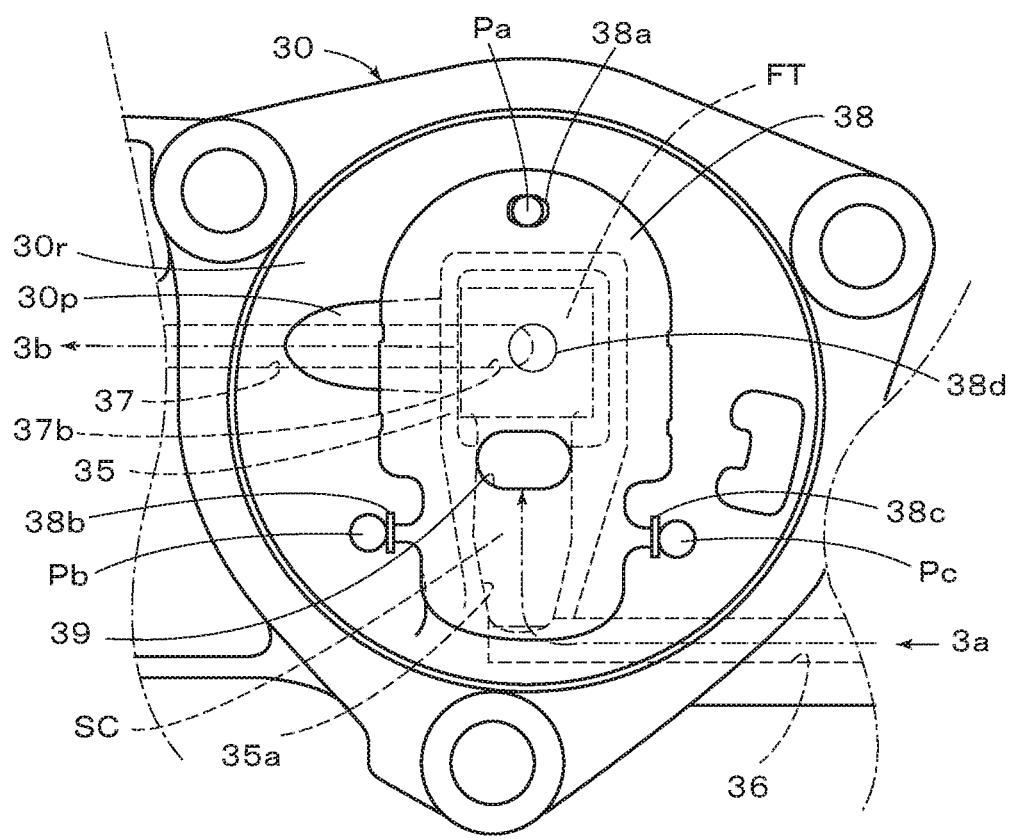
FIG. 2 is a plan view showing a part of an air compressor device according to an embodiment of the present invention, and the plan view as viewed from A-A in FIG. 1.
Figure 3:
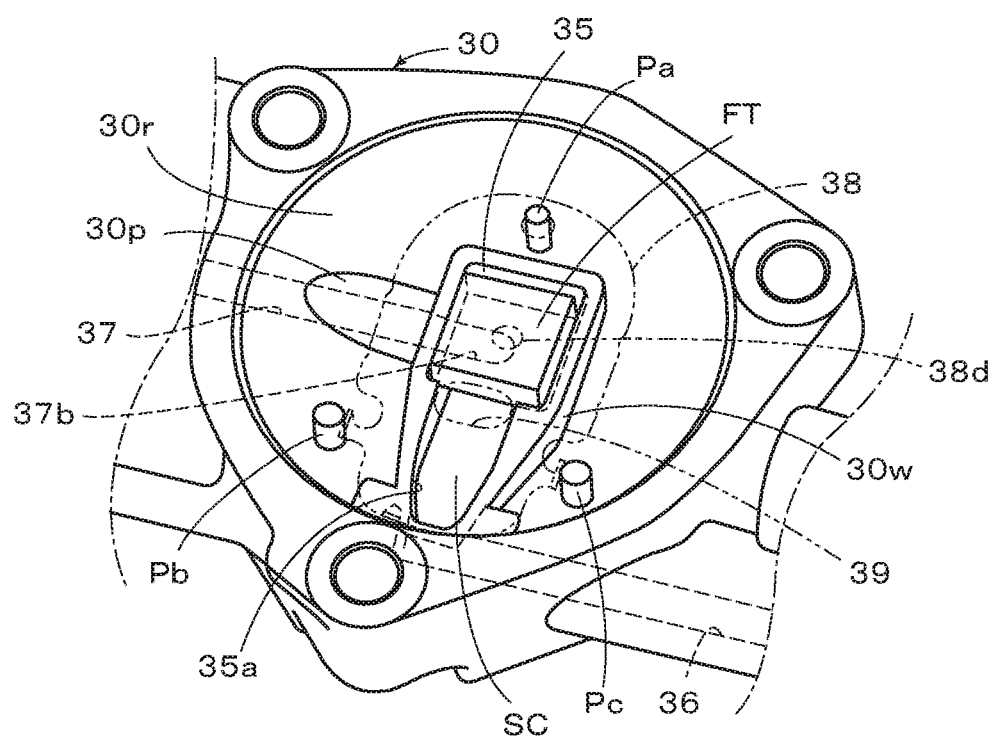
FIG. 3 is a perspective view enlarging a bottom portion of a housing of a dryer for use in an embodiment of the present invention.
Figure 4:
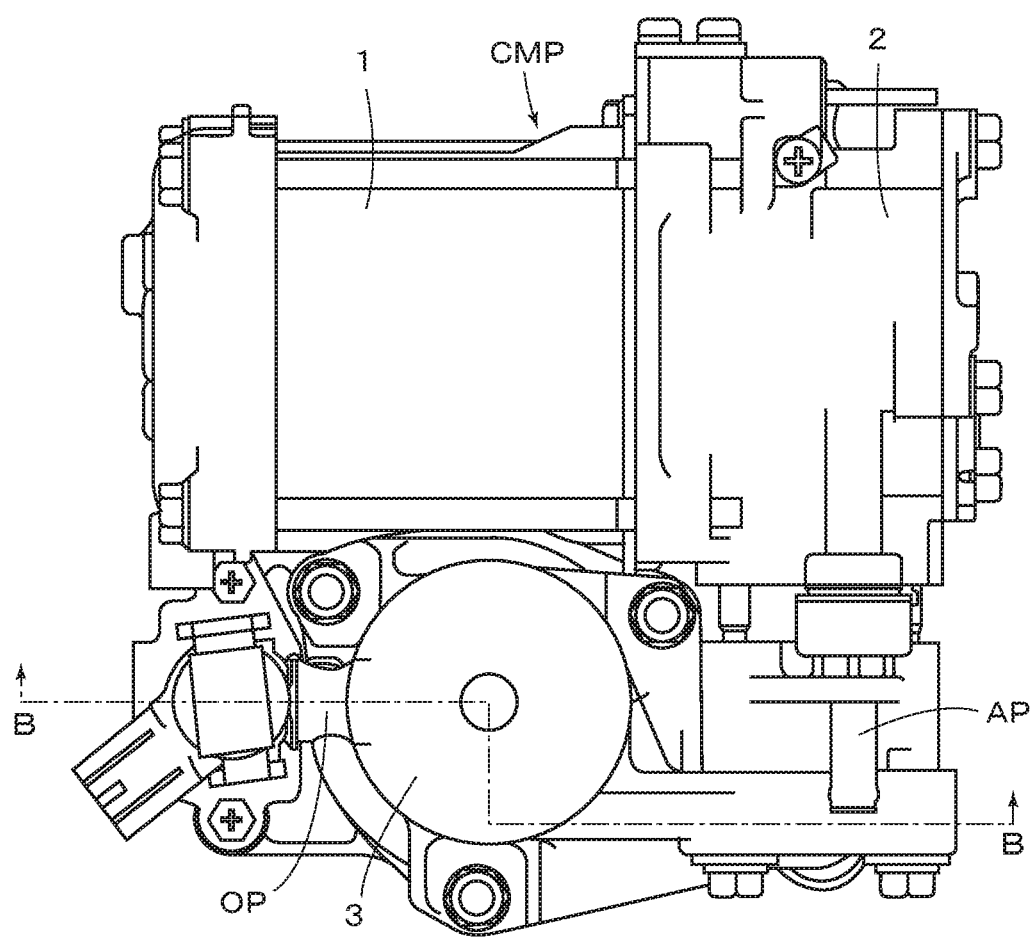
FIG. 4 is a plan view showing an air compressor device including a dryer according to an embodiment of the present invention.

According to the present embodiment, as shown in FIGS. 2 and 3, the bottom portion of the housing 30 is formed with a recess portion 30r of a spherical shape, on a bottom surface of which a separation wall portion 35 is integrally erected, so that the air-liquid separation chamber SC is defined inside of it. At the bottom portion of the housing 30, there are formed a communication passage 36 that constitutes the air introduction flow passage 3a and that communicates with a side surface of the air-liquid separation chamber SC, and a communication passage 37 that constitutes the air discharge flow passage 3b and that communicates with a lower surface of the air-liquid separation chamber SC, respectively. The communication passage 37 is formed to penetrate a protrusion portion 30p, which is protruded from the bottom portion of the housing 30 (bottom surface of the recess portion 30r), and formed with an opening portion 37b of a groove shape on the bottom portion of the housing 30.

Furthermore, a lid member 38 having an opening 39, which constitutes an air supply passage, is supported by the housing 30, to be abutted on the separation wall portion 35, thereby to define the air-liquid separation chamber SC. The air-liquid separation chamber SC includes an expansion portion 35a, a flow area of which is increased from the communication passage 36 (air introduction flow passage 3a) toward the opening 39 (air supply passage). And, it is so configured that a flow direction of the air introduced from the communication passage 36 (air introduction flow passage 3a) to the air-liquid separation chamber SC is perpendicular to a flow direction of the air supplied to the opening 39 (air supply passage) after introduction of the air. Accordingly, the air-liquid separation chamber SC is communicated with the desiccant agent 33 through the opening 39 (air supply passage) at its upper surface, and communicated with the communication passage 36 (air introduction flow passage 3a) and the communication passage 37 (air discharge flow passage 3b) at its side surface and its lower surface, respectively.

In the air-liquid separation chamber SC, accommodated is an adsorption member FT that adsorbs the moisture separated in the chamber SC. The adsorption member FT is configured by a rectangular parallelepiped filter made of nonwoven fabric, for example, so that the moisture in the air introduced from the communication passage 36 (air introduction flow passage 3a) is separated in the air-liquid separation chamber SC, and adsorbed by the adsorption member FT. As shown in FIGS. 2 and 3, the opening portion 37b of the communication passage 37 is formed to be placed at a center portion of the lower surface of the adsorption member FT accommodated in the air-liquid separation chamber SC, so that the communication passage 37 (air discharge flow passage 3b) is communicated with the air-liquid separation chamber SC at the lower side of the adsorption member FT.

The lid member 38 of the present embodiment is formed of a metallic plate, and formed with a positioning hole 38a, erected wall portions 38b and 38c. The lid member 38 is placed as indicated by a dashed-two-dotted line in FIG. 3, and supported by the housing 30 at a predetermined position by means of pins Pa, Pb and Pc erected on the bottom portion of the housing 30. Also, a protrusion 38d is integrally protruded from the lid member 38, so that the adsorption member FT is pressed toward the bottom portion of the housing 30 by the protrusion 38d, to be closely adhered to the lid member 38 and held thereby. The lid member 38 is supported by the housing 30 thorough the coil spring 34, as shown in FIG. 1.

Accordingly, when the air containing the moisture is supplied from the outside air to the dryer 3, the air compressed by the pump device 2 is introduced into the air-liquid separation chamber SC through the communication passage 36 (air introduction flow passage 3a), whereby a moisture precipitation is achieved positively, and the precipitated moisture is adsorbed by the adsorption member FT. That is, the air containing the moisture is supplied from the communication passage 36, opening area of which is relatively small, to the air-liquid separation chamber SC having the expansion portion 35a, so that the moisture contained in the air introduced into the air-liquid separation chamber SC is separated to be precipitated. In this occasion, heat is appropriately radiated through the metallic lid member 38, so that the moisture precipitation is accelerated. Then, the air with the moisture being separated (wet air) is supplied to the desiccant agent 33 through the opening 39 (air supply passage), opening area of which is relatively large, to be dried, and the precipitated moisture is discharged outside from the lower side of the adsorption member FT through the opening portion 37b and communication passage 37 (air discharge flow passage 3b). Consequently, when the air supplied to the desiccant agent 33 passes the air-liquid separation chamber SC, the contained moisture is removed to reduce the amount of moisture, whereby moisture adsorbed amount of the desiccant agent 33 is lowered, thereby to be easily regenerated. Even if so-called purge air quantity is small, therefore, the regeneration can be achieved.

Also, as the moisture precipitated in the air-liquid separation chamber SC is directly adsorbed by the adsorption member FT, the moisture will not be scattered into the dryer 3. In addition, in case of discharging the air (regeneration), as there exists the adsorption member FT in the flow passage for the discharged air, the moisture can be certainly discharged outside. That is, when the dried air is introduced from the discharge port 32 shown in FIG. 1 to the dryer 3, the desiccant agent 33 is regenerated. The air to be discharged at this time is discharged outside together with the moisture adsorbed by the adsorption member FT from the opening 39, through the adsorption member FT and the communication passage 37 (air discharge flow passage 3b). Furthermore, a drain (not shown), which discharges only the moisture adsorbed by the adsorption member FT outside, may be provided separately. Consequently, in the subsequent operations, any remained moisture will not be adsorbed by the desiccant agent 33, whereby the regeneration of the dryer 3 (desiccant agent 33) can be achieved efficiently, even in case of the air suspension device of so-called closed type as shown in FIG. 5.

The air compressor device CMP as configured above is disposed as an air pressure source within the air suspension device as shown in FIG. 5, reference numerals of 1-6, BP, OP and AP in a frame indicated by a dashed-dotted line in FIG. 5 corresponding to the aforementioned electric motor 1, pump device 2, dryer 3 and etc. respectively. And, air spring devices A1-A4 having air chambers 11-14 are provided respectively at four wheels of a vehicle, i.e., a front-right wheel FR, a front-left wheel FL, a rear-right wheel RR, and a rear-left wheel RL, only each support portion of which is indicated in FIG. 5. The air chambers 11-14 are communicated with the air compressor device CMP through the supply-discharge flow passages P1 and P2. In the supply-discharge flow passage P2 to be communicated with the air chambers 11-14, disposed are wheel switching valves 61-64 that control supplying and discharging the air to and from the air chambers 11-14, respectively.

Furthermore, in the supply-discharge flow passage P1 between the wheel switching valves 61-64 and the air compressor device CMP, disposed is a switching valve 71 that opens and closes the flow passage P1, and in a supply-discharge flow passage P3 between the pressure accumulation tank 50 and the discharge port OP of the air compressor device CMP, disposed is a tank switching valve 81 that opens and closes the flow passage P3. Also, in a supply-discharge flow passage P4 between the wheel switching valves 61-64 and the pressure accumulation tank 50, disposed are a supply-discharge switching valve 72 and a tank switching valve 82 that open and close the flow passage P4, and a portion between those valves is connected to the back pressure introduction port BP of the air compressor device CMP through a circulation passage P5. According to the present embodiment, the wheel switching valves 61-64, supply-discharge switching valves 71, 72 and tank switching valves 81, 82 are configured by normally-closed electromagnetic valves, at closed positions of which relief valves are configured, and controlled to be opened or closed by the control device ECU, as described later, and the electric motor 1 is controlled to be driven, and the air spring devices A1-A4 are controlled.

According to the air compressor device CMP as configured above, when the pump device 2 is actuated by the electric motor 1, the dried and compressed air is discharged through the dryer 3 and check valve 4. When the discharge switching valve 5 is placed in its open position, with the electric motor 1 being stopped, and the air is discharged through the dryer 3 and orifice 6, the desiccant agent 33 (shown in FIG. 2) in the dryer 3 is regenerated by the air to be discharged. Pressure sensors PS1 and PS2 are provided on the pressure accumulation tank 50 and supply-discharge flow passage P2, respectively, so that pressures in the pressure accumulation tank 50 and the supply-discharge flow passage P2 are detected by the pressure sensors PS1 and PS2, and detected pressure signals are fed to the control device ECU.

With respect to operation of the air suspension device as configured above, in a normal case, each switching valve is placed in its closed position as shown in FIG. 5, and the electric motor 1 is not operated, i.e., stopped state. In the case where the pressure detected by the pressure sensor PS1 is smaller than a predetermined pressure "K1", so that it is required to supply the compressed air into the pressure accumulation tank 50, in such a state as shown in FIG. 5, the tank switching valve 81 is placed in its open position, and the electric motor 1 is driven, whereby the air supplied from the atmosphere suction port AP is compressed by the pump device 2, and the compressed air is discharged from the discharge port OP through the dryer 3 and check valve 4, so that the compressed air is supplied into the pressure accumulation tank 50 through the tank switching valve 81. And, if the pressure detected by the pressure sensor PS1 is equal to or greater than the predetermined pressure "K1", the tank switching valve 81 is placed in its closed position, and the operation of the electric motor 1 is stopped.

Next, when the vehicle height increase (raising) command is detected in the control device ECU based on the signal detected by the vehicle height sensor HS or operation of the manual switch SW, if the pressure detected by the pressure sensor PS1 is equal to or greater than the predetermined pressure "K1", the supply-discharge switching valve 72, tank switching valve 82 and wheel switching valves 61-64 are placed in their open positions, the compressed air in the pressure accumulation tank 50 is supplied to the air chambers 11-14 through the supply-discharge flow passages P4 and P2, so that the air chambers 11-14 are expanded to increase (raise) the vehicle height. When the vehicle height has reached the desired height, the supply-discharge switching valve 72, tank switching valve 82 and wheel switching valves 61-64 are placed in their closed positions. During this period, if the pressure detected by the pressure sensor PS2 becomes smaller than a predetermined pressure "K2", the supply-discharge switching valve 71 is placed in its open position, and the electric motor 1 is driven, so that the compressed air is supplied from the discharge port OP to the supply-discharge flow passage P2, until the pressure becomes equal to or greater than the predetermined pressure "K2".

On the other hand, in the case as shown in FIG. 5, when the vehicle height decrease (lowering) command is detected, the wheel switching valves 61-64, supply-discharge switching valve 72 and tank switching valve 81 are placed in their open positions, and the electric motor 1 is driven. Consequently, the compressed air in the air chambers 11-14 is supplied into the pressure accumulation tank 50, through the supply-discharge flow passage P2 and P5, pump device 2, dryer 3, check valve 4 and tank switching valve 81, so that the air chambers 11-14 are reduced to decrease (lower) the vehicle height, and the pressure is accumulated in the pressure accumulation tank 50. When the vehicle height reaches the desired height, the electric motor 1 is stopped, and the wheel switching valves 61-64, supply-discharge switching valve 72 and tank switching valve 81 are placed in their closed positions.

Irrespective of the above-described vehicle height adjustment control and etc., when the desiccant agent 33 in the dryer 3 is required to be regenerated, the switching valve 81 and discharge switching valve 5 are placed in their open positions, so that the dried air in the pressure accumulation tank 50 is discharged, through the orifice 6 and dryer 3, and the desiccant agent 33 in the dryer 3 is regenerated by the air to be discharged. After this regeneration air discharge control, the discharge switching valve 5 is returned to be placed in its closed position, and the electric motor 1 is driven, so that the atmosphere is sucked from the atmosphere suction port AP, and the compressed air produced by the pump device 2 is supplied from the discharge port OP to the pressure accumulation tank 50 through the tank switching valve 81 placed in its open position. When the pressure detected by the pressure sensor PS1 is equal to or greater than the predetermined pressure "K1", the tank switching valve 81 is placed in its closed position, and the electric motor 1 is stopped, so that the pressure accumulation tank 50 is returned to its state for holding the high pressure.

The above-described air compressor device CMP is not limited to be used in the air suspension device of the vehicle, but may be used in other devices that require the air compressor device equipped with the electric motor, pump device and dryer, and it is also applicable to those other than the vehicle.

DESCRIPTION OF CHARACTERS

CMP air compressor device
A1-A4 air spring device
OP discharge port
BP back pressure introduction port
AP atmosphere suction port
SC air-liquid separation chamber
FT adsorption member
1 electric motor
2 pump device
3 dryer
3a air introduction flow passage
3b air discharge flow passage
30 housing
31 introduction port
32 discharge port
33 desiccant agent
34 coil spring
35 separation wall portion
36 communication passage (air introduction flow passage)
37 communication passage (air discharge flow passage)
38 lid member
39 opening (air supply passage)
50 pressure accumulation tank

The invention claimed is:

1. A dryer for an air suspension installed in an air suspension device of a vehicle comprising:
a housing having an air introduction flow passage and an air discharge flow passage located on one end portion in an axial direction of the housing, the one end portion being placed at a lower side of the housing in a vertical direction aligned with the axial direction,
a desiccant agent accommodated in the housing,
an air-liquid separation chamber that is formed at a bottom portion of the housing, and that includes an air supply passage for supplying the air to the desiccant agent at an upper surface of the housing, the air-liquid separation chamber being communicated with the air introduction flow passage and the air discharge flow passage to separate moisture contained in the air introduced from the air introduction flow passage, and
an adsorption member accommodated in the air-liquid separation chamber, to adsorb the moisture separated in the air-liquid separation chamber, wherein the air introduced from the air introduction flow passage is supplied to the air suspension device through the adsorption member and the desiccant agent,
wherein the air-liquid separation chamber includes an expansion portion, a flow area of which is increased from the air introduction flow passage toward the air supply passage.

2. The dryer for the air suspension as recited in claim 1, wherein a flow direction of the air introduced from the air introduction flow passage to the air-liquid separation chamber is perpendicular to a flow direction of the air supplied to the air supply passage after introduction of the air.

3. The dryer for the air suspension as recited in claim 2, wherein the air discharge flow passage is communicated with the air-liquid separation chamber at a lower side of the adsorption member.

4. The dryer for the air suspension as recited in claim 3, wherein the dryer comprises a separation wall portion integrally erected from the bottom portion of the housing, and a lid member having the air supply passage, the lid member being abutted on the separation wall portion and supported by the housing to define the air-liquid separation chamber.

5. The dryer for the air suspension as recited in claim 2, wherein the dryer comprises a separation wall portion integrally erected from the bottom portion of the housing, and a lid member having the air supply passage, the lid member being abutted on the separation wall portion and supported by the housing to define the air-liquid separation chamber.

6. The dryer for the air suspension as recited in claim 1, wherein the air discharge flow passage is communicated with the air-liquid separation chamber at a lower side of the adsorption member.

7. The dryer for the air suspension as recited in claim 6, wherein the dryer comprises a separation wall portion integrally erected from the bottom portion of the housing, and a lid member having the air supply passage, the lid member being abutted on the separation wall portion and supported by the housing to define the air-liquid separation chamber.

8. The dryer for the air suspension as recited in claim 1, wherein the dryer comprises a separation wall portion integrally erected from the bottom portion of the housing, and a lid member having the air supply passage, the lid member being abutted on the separation wall portion and supported by the housing to define the air-liquid separation chamber.

9. A dryer for an air suspension installed in an air suspension device of a vehicle comprising:
a housing having an air introduction flow passage and an air discharge flow passage located on one end portion in an axial direction of the housing, the one end portion being placed at a lower side of the housing in a vertical direction aligned with the axial direction,
a desiccant agent accommodated in the housing,
an air-liquid separation chamber that is formed at a bottom portion of the housing, and that includes an air supply passage for supplying the air to the desiccant agent at an upper surface of the housing, the air-liquid separation chamber being communicated with the air introduction flow passage and the air discharge flow passage to separate moisture contained in the air introduced from the air introduction flow passage, and
an adsorption member accommodated in the air-liquid separation chamber, to adsorb the moisture separated in the air-liquid separation chamber, wherein the air introduced from the air introduction flow passage is supplied to the air suspension device through the adsorption member and the desiccant agent, wherein the dryer comprises a separation wall portion integrally erected from the bottom portion of the housing, and a lid member having the air supply passage, the lid member being abutted on the separation wall portion and supported by the housing to define the air-liquid separation chamber, and the adsorption member is closely adhered to the lid member, and held within the air-liquid separation chamber.

* * * * *